United States Patent
Tabata et al.

[11] Patent Number: 6,132,334
[45] Date of Patent: Oct. 17, 2000

[54] CONTROL SYSTEM FOR AUTOMATIC TRANSMISSION

[75] Inventors: Atsushi Tabata, Okazaki; Masato Kaigawa; Nobuaki Takahashi, both of Toyota, all of Japan

[73] Assignee: Toyota Jidosha Kabushiki Kaisha, Toyota, Japan

[21] Appl. No.: 08/945,271

[22] PCT Filed: Feb. 27, 1997

[86] PCT No.: PCT/JP97/00567

§ 371 Date: Oct. 27, 1997

§ 102(e) Date: Oct. 27, 1997

[30] Foreign Application Priority Data

| Feb. 27, 1996 | [JP] | Japan | 8-065525 |
| Feb. 27, 1996 | [JP] | Japan | 8-065526 |
| Feb. 27, 1996 | [JP] | Japan | 8-065527 |

[51] Int. Cl.⁷ .......................... F16H 61/04; B60K 41/06; F02D 29/02
[52] U.S. Cl. .......................................................... 477/149
[58] Field of Search .................................. 477/143, 144, 477/149, 156

[56] References Cited

U.S. PATENT DOCUMENTS

| 3,813,964 | 6/1974 | Ichimura et al. | 477/119 |
| 4,653,351 | 3/1987 | Downs et al. | 477/149 X |
| 4,671,139 | 6/1987 | Downs et al. | 477/149 X |
| 4,891,759 | 1/1990 | Kato | 477/111 X |
| 4,928,557 | 5/1990 | Takada et al. | |
| 5,036,729 | 8/1991 | Nitz et al. | 477/149 X |
| 5,046,174 | 9/1991 | Lentz et al. | 477/148 X |
| 5,079,970 | 1/1992 | Butts et al. | 477/120 X |
| 5,307,711 | 5/1994 | Kimura et al. | 477/111 X |
| 5,443,427 | 8/1995 | Ataka et al. | 477/148 X |
| 5,501,645 | 3/1996 | Taniguchi et al. | 477/130 |
| 5,505,673 | 4/1996 | Tsukamoto et al. | 477/143 X |
| 5,609,549 | 3/1997 | Usuki et al. | 477/125 |
| 5,772,554 | 6/1998 | Tabata | 477/118 X |
| 5,800,309 | 9/1998 | Takiguchi et al. | 477/149 X |
| 5,865,707 | 2/1999 | Shimada et al. | 477/43 X |

FOREIGN PATENT DOCUMENTS

| 1-150050 | 6/1989 | Japan. |
| 2-31069 | 2/1990 | Japan. |
| 4-91332 | 3/1992 | Japan. |
| 4-278844 | 10/1992 | Japan. |
| 4-345539 | 12/1992 | Japan. |
| 5-231525 | 9/1993 | Japan. |
| 6-235451 | 8/1994 | Japan. |
| 6-331016 | 11/1994 | Japan. |
| 6-341535 | 12/1994 | Japan. |
| 7-27217 | 1/1995 | Japan. |

*Primary Examiner*—Dirk Wright
*Attorney, Agent, or Firm*—Oblon, Spivak, McClelland, Maier & Neustadt, P.C.

[57] ABSTRACT

A control system for an automatic transmission, which is capable of controlling the hydraulic pressures for frictional engagement units when a predetermined shift is performed such that a first frictional engagement unit is engaged and a second frictional engagement unit is released, being connected to a power source, the revolving speed of which is temporarily raised when a predetermined shift down is performed, the control unit for the automatic transmission for a vehicle being structured such that shift which is performed by engaging and releasing the two frictional engagement units is judged, whether the judged shift is shift down in which the revolving speed of the power source is temporarily raised or shift down in which the revolving speed of the power source is not raised is judged, and the contents of control of the hydraulic pressures for the frictional engagement units are changed between shift down in which the revolving speed of the power source is temporarily raised and shift down in which the revolving speed of the power source is not raised.

4 Claims, 11 Drawing Sheets

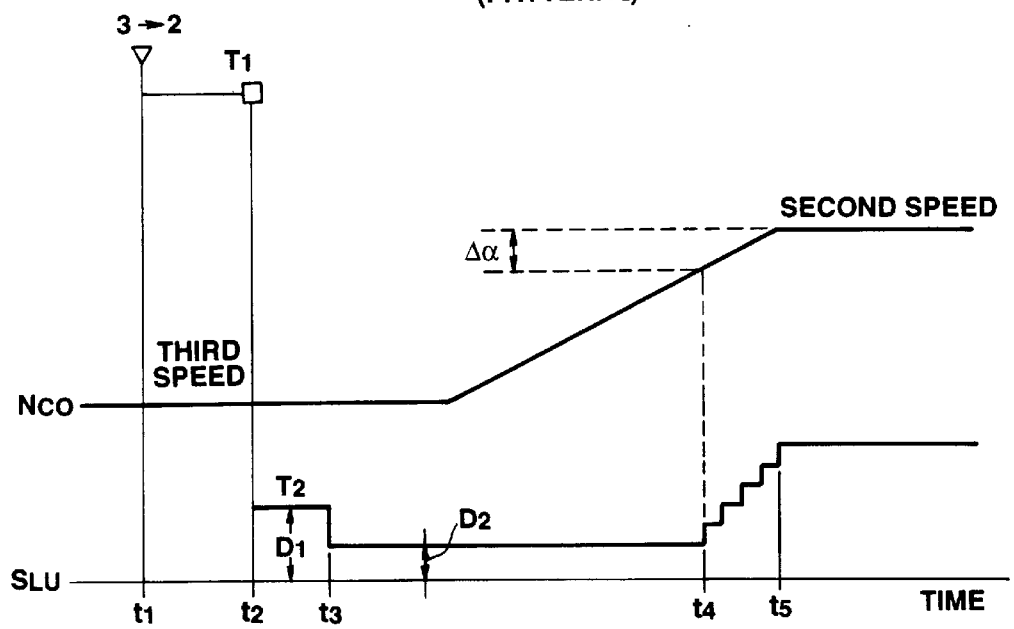
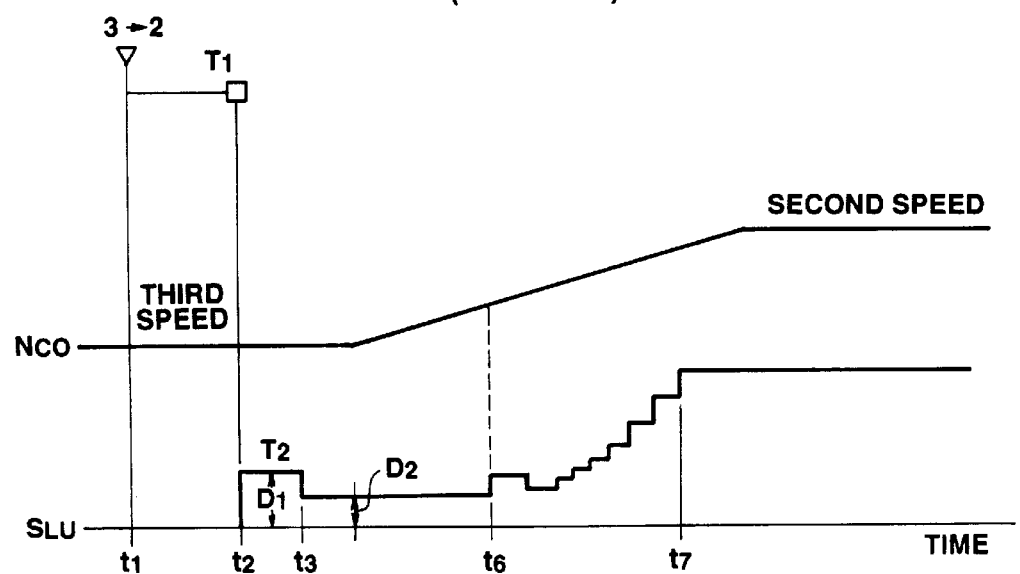

(PATTERN III)

FIG.13

| POSITION | | | No.1 | No.2 | No.3 | No.4 | SLU | SLN | C-1 | C-2 | C-0 | B-1 | B-2 | B-3 | B-4 | B-0 |
|---|---|---|---|---|---|---|---|---|---|---|---|---|---|---|---|---|
| P | | | ○ | × | × | × | × | × | × | × | × | × | × | × | ○ | × |
| R | (V < 20) | | × | × | × | ○ | × | × | × | ○ | × | × | × | × | ○ | ○ |
| R | (V ≥ 20) | | ○ | ○ | × | ○ | × | × | × | ○ | × | × | × | × | × | × |
| N | | | ○ | × | ○ | × | × | × | × | × | ○ | × | × | × | × | × |
| D·3·2·(L) | 1ST | ORDINARY | ○ | × | ○ | ○ | × | × | ○ | × | ○ | × | × | × | × | × |
| | 1ST | E/G BRAKE | ○ | × | ○ | × | × | ○ | ○ | × | ○ | × | × | × | ○ | × |
| | 2ND | ORDINARY | ○ | ○ | ○ | ○ | × | × | ○ | × | × | × | × | ○ | × | × |
| | 2ND | E/G BRAKE | ○ | ○ | ○ | × | × | ○ | ○ | × | ○ | × | × | ○ | × | × |
| | 3RD | ORDINARY | × | ○ | ○ | ○ | ◎ | × | ○ | × | ○ | × | ○ | × | × | × |
| | 3RD | E/G BRAKE | × | ○ | ○ | × | ◎ | ○ | ○ | × | ○ | ○ | ○ | × | × | × |
| | 4TH | | × | × | ○ | ○ | ◎ | × | ○ | ○ | ○ | × | ○ | × | × | × |
| | 5TH | | × | × | × | ○ | ◎ | × | ○ | ○ | × | × | ○ | × | × | ○ |

REMARKS:
○ : ON
× : OFF
◎ : ON: L-UP ON / OFF: L-UP OFF
— : ENGAGEMENT / RELEASE

CONTROL SYSTEM FOR AUTOMATIC TRANSMISSION

TECHNICAL FIELD

The present invention relates to a control system for an automatic transmission, and more particularly to a system for controlling hydraulic pressure for use in so-called clutch-to-clutch shift or direct pressure control in accordance with control of a power source, such as an engine or a motor.

BACKGROUND ART

Since shift of the gear stage in an automatic transmission involves change in the rotations of a plurality of rotative elements, the inertia forces of the rotative elements must be absorbed to make the torque shift to be performed smoothly in order to prevent shift shock. Control for preventing the shift shock has been performed by controlling engaging pressure or releasing pressure for frictional engagement units, such as clutches and brakes, for performing the shift so as to absorb the inertia forces (energy) attributable to sliding of the frictional engagement units.

Change in the rotations of the engine which occurs when shift is performed becomes different between a power-on state in which the accelerator pedal has been depressed and a power-off state contrary to the power-on state. Therefore, when clutch-to-clutch shift is performed in which the states of engagement of two frictional engagement units are simultaneously changed, the engaging pressure for the on-coming frictional engagement unit is made adaptable to the state of revolution of the engine when the shift is performed.

When shift down, which is clutch-to-clutch shift, is performed, the engaging pressure for the on-coming frictional engagement unit is gradually raised (swept up) after rise in the engine revolving speed to the synchronized revolving speed at the gear stage set by the shift down because the engine revolving speed is attempted to be raised in the power-on state. In the power-off state, the engine revolving speed is undesirably lowered if the frictional engagement unit which has realized the gear stage is released. Therefore, the engaging pressure for the on-coming frictional engagement unit is enlarged in an early stage to raise the engine revolving speed to the synchronized revolving speed at the gear stage set by the shift down. That is, the engaging pressure for the frictional engagement unit is controlled to be adaptable to the tendency of the change in the revolving speed of the engine when the shift is performed.

When the clutch-to-clutch shift is performed, learning control is performed such that the hydraulic pressure is corrected in accordance with the state of fuel injection in the engine and the tied-up state when the previous shift has been performed and the shift is performed with the corrected hydraulic pressure when the next shift is performed.

That is, the clutch-to-clutch shift is performed such that the hydraulic pressure for at least one of the frictional engagement unit of the frictional engagement units for performing the shift is successively changed to correspond to the state of progress of the shift to prevent shock attributable to rapid change of the output torque. In this case, change in the revolving speed (the engine revolving speed) input to the automatic transmission is affected by the input torque, the friction coefficient of the frictional member or the change rate of the hydraulic pressure. Thus, there arises a possibility that fuel injection in the engine is undesirably performed excessively or a tied-up state occurs on the contrary.

Therefore, the foregoing problems have been prevented by correcting the controlled value of the hydraulic pressure in accordance with the detected state when the shift has been performed and the next clutch-to-clutch shift is controlled in accordance with the corrected controlled value. Since the foregoing control is able to use the individual difference in the automatic transmission and the factor such as the change of the frictional engagement unit as the time lapses in the control of the shift, control of the shift suitable for each case can be performed. Therefore, shift shock occurring when the clutch-to-clutch shift is performed can be prevented more satisfactorily.

Since it is preferable that rapid change in the rotations is prevented in order to prevent shift shock, a throttle valve of the engine has been electronically controlled to also control the engine revolving speed as well as the control the hydraulic pressure for the automatic transmission, in recent years. An example of the foregoing structure has been disclosed in Japanese Patent Laid-Open No. 5-231525 (JPA-5-231525).

The invention disclosed as described above relates to a hydraulic pressure control when so-called synchronizing shift is performed in which the opening of the throttle is enlarged by detecting the shift down when the shift down has been performed in a state where the throttle valve is closed. Thus, the engine revolving speed is synchronized with the revolving speed at the gear stage after the shift and shift down is performed in the foregoing state. Moreover, hydraulic pressure control means for preventing or restraining rise in the line pressure occurring attributable to the temporary enlargement of the opening of the throttle when the synchronizing shift is performed is provided. Thus, shock occurring because of the rapid torque capacity of the frictional engagement unit when the shift down is performed is prevented.

When the above-mentioned clutch-to-clutch shift or direct control of the pressure is performed, initial hydraulic pressure control has been performed in which the hydraulic pressure which is applied to the on-coming frictional engagement unit is temporarily raised simultaneously or immediately after the shifted output has been performed to reduce a so-called pack clearance so as to cause the frictional engagement unit to immediately be provided with a torque capacity when higher hydraulic pressure is applied.

The initial hydraulic pressure control is a control which is capable of bringing the frictional engagement unit into a standby state in which the frictional engagement unit can immediately and substantially be engaged. That is, if insufficient control is performed such that the initial hydraulic pressure is too low, timing for the frictional engagement unit to substantially be engaged is delayed and thus the shift response deteriorates. If the initial hydraulic pressure is too high, the frictional engagement unit is undesirably provided with an excessively large torque capacity. As a result, there arises a risk that a next control of low-pressure standby cannot satisfactorily be performed.

The above-mentioned synchronizing shift is performed at a down shift in a substantial power-off state when a manual selection by a driver is carried out, for example. If the shift down is performed by so-called clutch-to-clutch shift in which engagement/release states of two frictional engagement units are simultaneously changed, the engaging pressure for the off-going frictional engagement unit is relatively early swept up to raise the engine revolving speed to the synchronized revolving speed at the gear stage after the shift. That is, in accordance with the state of the revolution of the engine when the shift down has been judged, the control of the hydraulic pressure for the frictional engagement unit is judged and performed.

On the other hand, the engine is controlled such that the revolving speed is raised in accordance with a fact that the shift down is the synchronizing shift. Since the control to raise the revolving speed is performed by temporarily opening the throttle valve, also the engine torque is simultaneously enlarged.

In this case, the automatic transmission is controlled in accordance with the contents of control in the power-off state and the engaging pressure for the on-coming frictional engagement unit is raised when the shift is completed. However, since the throttle opening is enlarged after the shift has been started, a power-on state is undesirably realized. As a result, the control of the hydraulic pressure for the automatic transmission and the state of the operation of the engine do not coincide with each other. Thus, the revolving speed of the engine is undesirably raised when the shift is completed, thus raising a possibility that the shift shock takes place.

The above-mentioned problem also arises when the foregoing learning control of the hydraulic pressure is performed. That is, the learned value of the hydraulic pressure includes the torque applied to the automatic transmission when the previous shift has been performed. Therefore, if the hydraulic pressure for the synchronizing shift is controlled in accordance with the learned value of the hydraulic pressure when an ordinary shift has been performed, there arises a possibility that the shift shock takes place because the states of the input torque are considerably different from each other.

The foregoing problems also arise when ordinary clutch-to-clutch shift except for the synchronizing shift is performed. If the learned value includes data obtained when the synchronizing shift has been performed, the input torque at a gear shift in which the learned value is obtained differs from the input torque at the gear shift which must be controlled, and the learned value to be used in the gear shift is inadequate. Thus, there arises a possibility that excessive shift shock takes place.

When the foregoing control of the initial hydraulic pressure is performed such that the ordinary shift and the synchronizing shift are controlled in the same manner, the difference between the operation state of the engine when the shift is performed and the input to the automatic transmission may cause an inadequate initial hydraulic pressure at the gear shift. Moreover, there arises a possibility that the following control of the hydraulic pressure during the shift is delayed.

An object of the present invention is to prevent shift shock in so-called synchronizing.

Another object of the present invention is to provide a control unit which is capable of properly controlling learning of the hydraulic pressure in a clutch-to-clutch shift.

Another object of the present invention is to provide a control unit which is capable of adequately controlling the initial hydraulic pressure at a clutch-to-clutch shift or at a shift carried out by directly controlling the hydraulic pressure.

DISCLOSURE OF THE INVENTION

A control unit according to the present invention is arranged such that the contents of control of the hydraulic pressures of frictional engagement units are made to be different from those employed when an ordinary shift down operation is performed in a case where the shift down, in which a first frictional engagement unit is engaged and a second means is released, is shift of a type in which the revolving speed of a power source is temporarily raised to about the synchronized revolving speed after the shift has been performed, that is, in a case where synchronizing shift is performed. In case that the hydraulic pressure for the first frictional engagement unit is temporarily raised immediately after the shifted output has been performed, the hydraulic pressure is made to be higher than that for the ordinary shift or the time for which the raised pressure is maintained is elongated. Therefore, delay of the shift and deterioration in the durability occurring attributable to sliding of the frictional engagement unit can be prevented.

When the engaging pressure for the first frictional engagement unit is gradually raised to perform the shift in case that shift down is performed such that the revolving speed of the power source is temporarily raised, the engaging pressure is early raised as compared with another shift down operation or the raising ratio is raised. Therefore, even if so-called synchronizing shift has been performed and thus the revolving speed of the power source has been raised, the hydraulic pressures for the frictional engagement units are made to be suitable to the input torque. As a result, shift shock and deterioration in the durability of the frictional engagement units can be prevented.

When the shift down is performed by the clutch-to-clutch shift method in which the revolving speed of the power source is temporarily raised, the present invention is arranged such that the learning control of the hydraulic pressures for the frictional engagement units for performing the shift is performed in a manner different from that for another shift down operation. Therefore, the controlled value obtained from the learning control can be made to be adaptable to the input torque. As a result, shift shock and deterioration in the durability of the frictional engagement units can be prevented.

BRIEF DESCRIPTION OF DRAWINGS

FIG. 2 is a time chart showing control pattern I for a third brake pressure when the gear stage is shifted down from a third speed to a second speed in a power-on state;

FIG. 3 is a time chart showing control pattern II for the third brake pressure when the gear stage is shifted down from the third speed to the second speed in a power-off state;

FIG. 13 is a table showing engagements of frictional engagement units for setting gear stages in the automatic transmission;

BEST MODE FOR CARRYING OUT THE INVENTION

Figure 11:
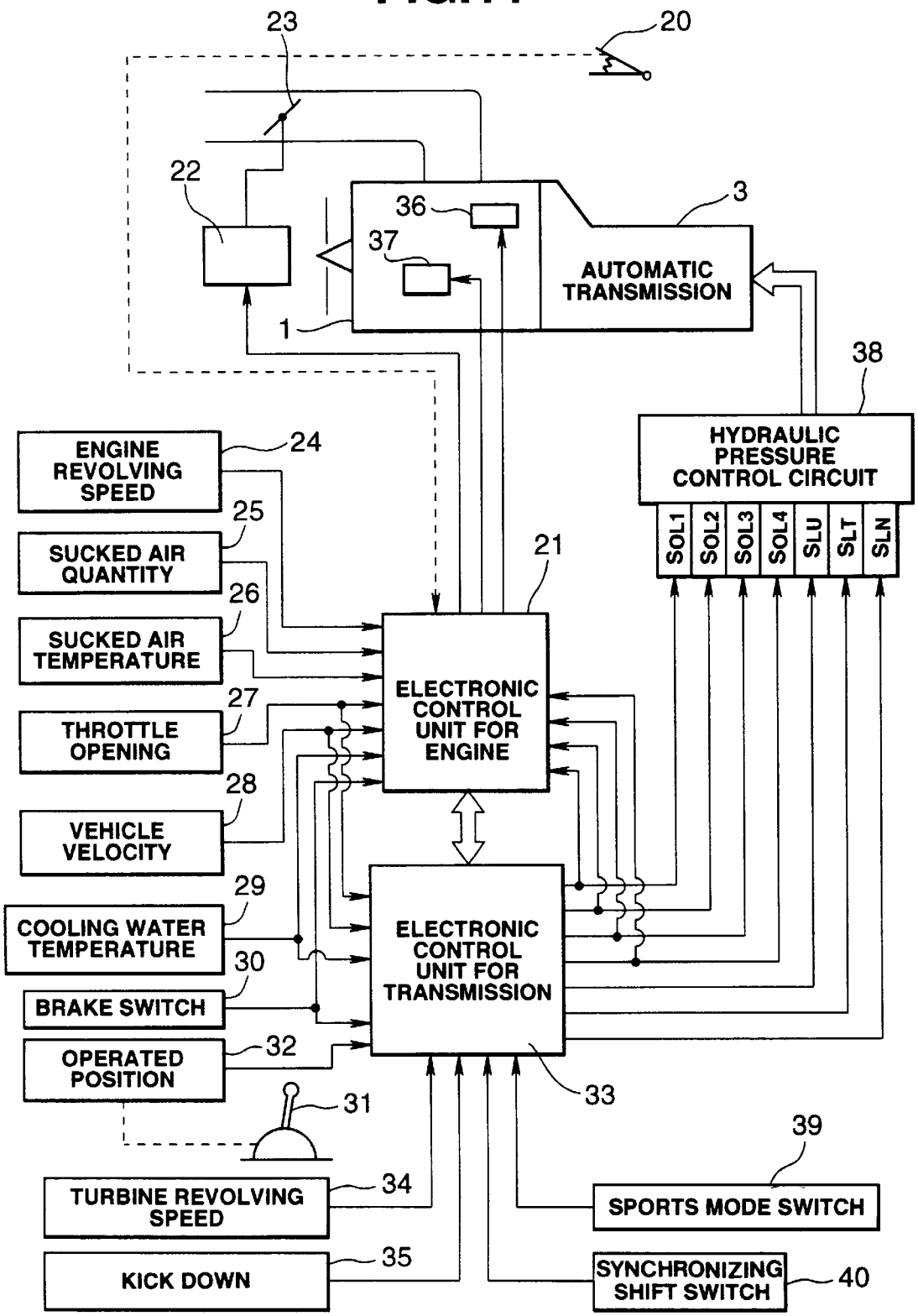
FIG. 11 is a diagram showing the overall control system according to the present invention.

The present invention will now be described further specifically with reference to the drawings. Initially, the overall control system will now be described. FIG. 11 shows the control system showing an engine 1 and an automatic transmission 3. A signal corresponding to the depression of an acceleration pedal 20 is supplied to an engine electronic control unit 21. A suction duct of the engine 1 is provided with an electronic throttle valve 23 which is operated by a throttle actuator 22. In accordance with the depression of the acceleration pedal 20, a control signal is output from the engine electronic control unit 21 to the throttle actuator 22 so that the degree of opening is controlled in accordance with the controlled variable.

There are disposed an engine revolving speed sensor 24 for detecting the revolving speed of the engine 1, an air flow meter 25 for detecting the quantity of inlet air, an inlet-air temperature sensor 26 for detecting the temperature of the inlet air, a throttle sensor 27 for detecting opening degree θ of the electronic throttle valve 23, a vehicle speed sensor 28 for detecting vehicle velocity V in accordance with the revolving speed of an output shaft 17 or the like, a cooling-water temperature sensor 29 for detecting the temperature of cooling water for the engine 1, a brake switch 30 for detecting the operation of a brake and an operation position sensor 32 for detecting the operated position of a shift lever 31. Signals representing engine revolving speed Ne, inlet-air temperature Tha, opening θ of the electronic throttle valve 23, vehicle velocity V, engine cooling water temperature THw, operation state BK of the brake and operated position Psh of the shift lever 31 are supplied from the foregoing sensors to the engine electronic control unit 21 or the transmission electronic control unit 33. Note that the transmission electronic control unit 33 is supplied with signals representing the opening θ of the electronic throttle valve 23 and engine cooling water temperature THw and a signal representing the operated position Psh of the shift lever 31.

Moreover, a signal representing turbine revolving speed $N_T$ is supplied from a turbine revolving speed sensor 34 for detecting the revolving speed of a turbine runner to the transmission electronic control unit 33. A signal representing a kick-down operation is supplied from a kick down switch 35 for detecting the operation of the acceleration pedal 20 to the maximum operation position to the transmission electronic control unit 33. Moreover, a sports-mode switch 39 which is manually operated to output a gear shift signal and a synchronizing shift switch 40 are connected to the transmission electronic control unit 33. An example of an apparatus of the foregoing has been disclosed in Japanese Patent Laid-Open No. 6-307527 and Japanese Patent Application No. 7-215892.

The sports-mode switch is a switch for selecting a mode for shifting the transmission by a manual operation or a switch for outputting a transmission signal generated in the manual operation, the sports-mode switch being provided for a shift apparatus or an instrument panel (not shown). Structure of the foregoing type have been disclosed in, for example, Japanese Patent Laid-Open No. 6-307527, Japanese Patent Laid-Open No. 6-48216 and Japanese Patent Laid-Open No. 6-2761. The synchronizing shift switch is a switch for shifting down the transmission by one step, synchronizing shift switch being disposed at an arbitrary position, for example, in a central portion of a steering wheel (not shown). When the transmission is shifted down by operating the foregoing switches, a so-called synchronizing shift control is performed such that the electronic throttle valve 23 is opened by a degree greater than the depression of the acceleration pedal 20 in response to an output signal from the engine electronic control unit 21 and the engine revolving speed Ne is raised to the synchronized revolving speed for the shifted stage after the transmission has been shifted down. An example of the above-mentioned control has been disclosed in, for example, Japanese Patent Application No. 7-215892.

The engine electronic control unit 21 is a so-called microcomputer having a central processing unit (CPU), a storage unit (RAM and ROM) and an input/output interface. The CPU uses a supplied signal in accordance with a program previously stored in the ROM while using a temporal storage function of the RAM to perform various engine control operations. For example, the CPU controls a fuel injection valve 36 for controlling the quantity of fuel to be injected, an igniter 37 for controlling the ignition timing, a bypass valve (not shown) for controlling the idling speed and all of throttle controls including the traction control by causing the throttle actuator 22 to control the electronic throttle valve 23.

Also the transmission electronic control unit 33 is a microcomputer similarly to the foregoing engine electronic control unit 21. The CPU processes a supplied signal in accordance with a program previously stored in the ROM by using the temporary storage function of the RAM. Moreover, the CPU operates solenoid valves or linear solenoid valves in a hydraulic-pressure control circuit 38. For example, the transmission electronic control unit 33 controls a linear solenoid valve $S_{LT}$ for generating output pressure $PS_{LT}$ corresponding to the opening of the electronic throttle valve 23, a linear solenoid valve $S_{LN}$ for controlling the back pressure for accumulators and the quantity of slip of the lock-up clutch. Moreover, the CPU operates a linear solenoid valve $S_{LU}$ for controlling the engaged pressure for a predetermined clutch or a brake during shift of the transmission in accordance with the progress of the shift of the transmission and to correspond to an applied torque.

The transmission electronic control unit 33 judges the gear stage of the automatic transmission 3 and an engagement state of the lock-up clutch in accordance with the standard throttle opening θ (opening of the throttle obtained by converting the depression of the accelerator pedal with a predetermined non-linear characteristic), the vehicle velocity V and a shift map using the foregoing factors as parameters. To realize the judged gear stage and the state of engagement, the transmission electronic control unit 33 operates No. 1 to No. 3 solenoid valves $S_{OL1}$, $S_{OL2}$ and $S_{OL3}$ of the hydraulic-pressure control circuit 38. When engine brake is generated, the transmission electronic control unit 33 operates a No. 4 solenoid valve $S_{OL4}$.

Figure 12:
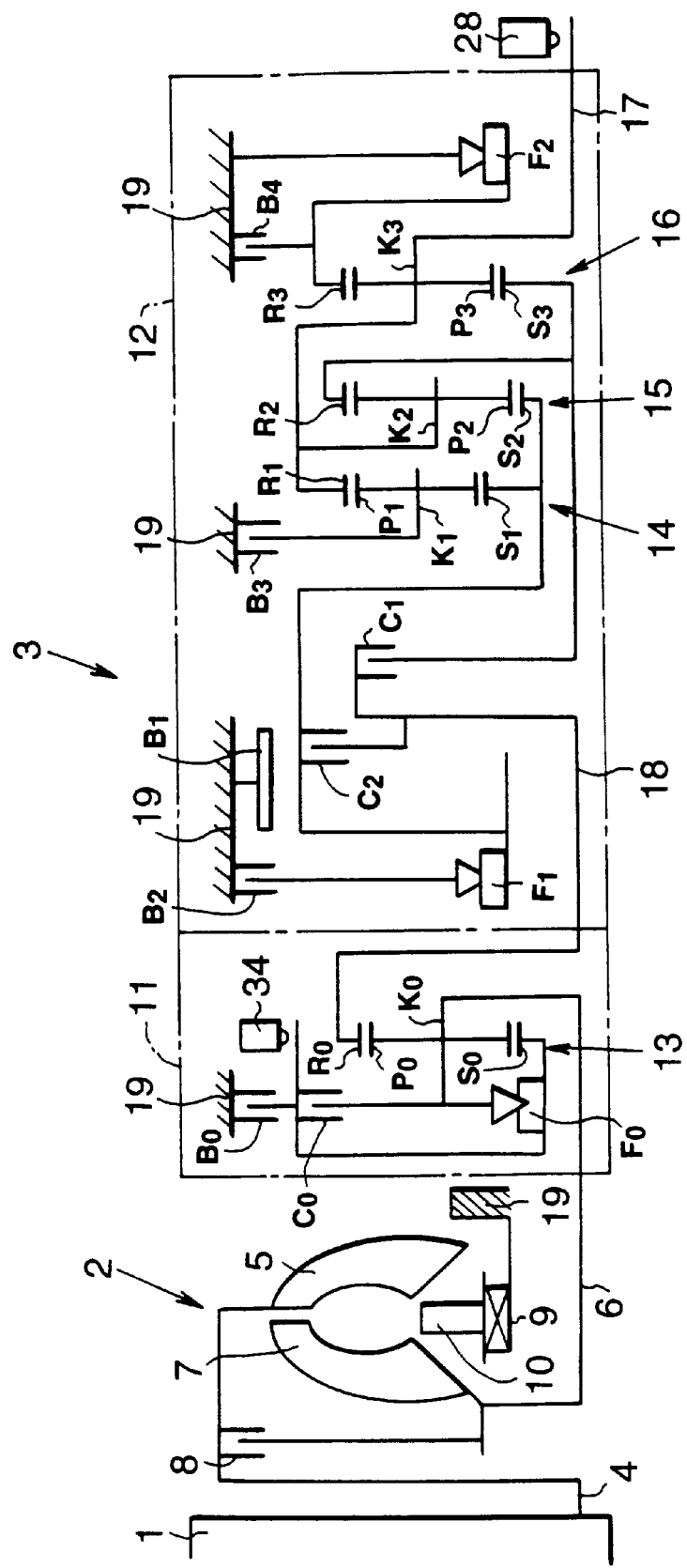
FIG. 12 is a skeleton diagram showing an example of a gear train of an automatic transmission according to the present invention.

The automatic transmission 3 according to this embodiment is structured to be capable of setting five forward and one reverse gear stages, as shown in a skeleton diagram shown in FIG. 12. That is, as shown in FIG. 12, the automatic transmission 3 is connected to the engine 1 through a torque converter 2. The torque converter 2 has a pump impeller 5 connected to a crank shaft 4, a turbine runner 7 connected to an input shaft 6 of the automatic transmission 3, a lock-up clutch 8 for establishing the direct connection between the pump impeller 5 and the turbine runner 7 and a stator 10, the one directional rotation of which is inhibited by a one-way clutch 9.

The automatic transmission 3 has a sub-transmission section 11 for selecting a high gear stage or a low gear stage and a main-transmission section 12 which is capable of selecting gear stage from the reverse gear stage and the four forward gear stages. The sub-transmission section 11 has; a planetary gear unit 13 which is composed of a sun gear $S_0$, a ring gear $R_0$ and a pinion P0 rotatively supported by a carrier $K_0$ and meshed with the sun gear $S_0$ and the ring gear $R_0$; a clutch $C_0$ and a one-way clutch $F_0$ disposed between the sun gear $S_0$ and the carrier $K_0$; and a brake $B_0$ disposed between the sun gear $S_0$ and a housing 19.

The main-transmission section 12 has; a first planetary gear unit 14 composed of a sun gear $S_1$, a ring gear $R_1$ and a pinion $P_1$ rotatively supported by a carrier $K_1$ and meshed with the sun gear $S_1$ and the ring gear $R_1$; a second planetary gear unit 15 composed of a sun gear $S_2$, a ring gear $R_2$ and a pinion $P_2$ rotatively supported by a carrier $K_2$ and meshed with the sun gear $S_2$ and the ring gear $R_2$; and a third planetary gear unit 16 composed of a sun gear $S_3$, a ring gear $R_3$ and a pinion $P_3$ rotatively supported by a carrier $K_3$ and meshed with the sun gear $S_3$ and the ring gear $R_3$.

The sun gear $S_1$ and the sun gear $S_2$ are integrally connected to each other, the ring gear $R_1$, the carrier $K_2$ and the carrier $K_3$ are integrally connected to one another. The carrier $K_3$ is connected to the output shaft 17. The ring gear $R_2$ is integrally connected to the sun gear $S_3$. A first clutch $C_1$ is disposed among the ring gear $R_2$, the sun gear $S_3$ and an intermediate shaft 18. A second clutch $C_2$ is disposed among the sun gear $S_1$, the sun gear S2 and the intermediate shaft 18.

As brake means, a band type first brake $B_1$ for stopping rotations of the sun gear $S_1$ and the sun gear $S_2$ is provided for the housing 19. A first one-way clutch $F_1$ and a second brake $B_2$ are in series disposed among the sun gear $S_1$, the sun gear $S_2$ and the housing 19. The first one-way clutch $F_1$ is arranged to be engaged when the sun gear $S_1$ and the sun gear $S_2$ are inversely rotated opposite to the direction of rotation of the input shaft 6.

A third brake $B_3$ is disposed between the carrier $K_1$ and the housing 19. A fourth brake $B_4$ and a second one-way clutch $F_2$ are in parallel disposed between the ring gear $R_3$ and the housing 19. The second one-way clutch $F_2$ is arranged to be engaged when the ring gear $R_3$ is rotated inversely. The clutches $C_0$, $C_1$ and $C_2$ and the brakes $B_0$, $B_1$, $B_2$, $B_3$ and $B_4$ are hydraulic frictional engagement units having frictional elements which are engaged when hydraulic pressure is applied.

The foregoing automatic transmission is able to set any one of five forward and reverse gear stages. The states of engagements and releases of each frictional engagement units for setting the gear stage are shown in an engagement operation table shown in FIG. 13. Referring to FIG. 13, mark ◯ indicates an engaged state and mark X indicates a released state.

Figure 14:
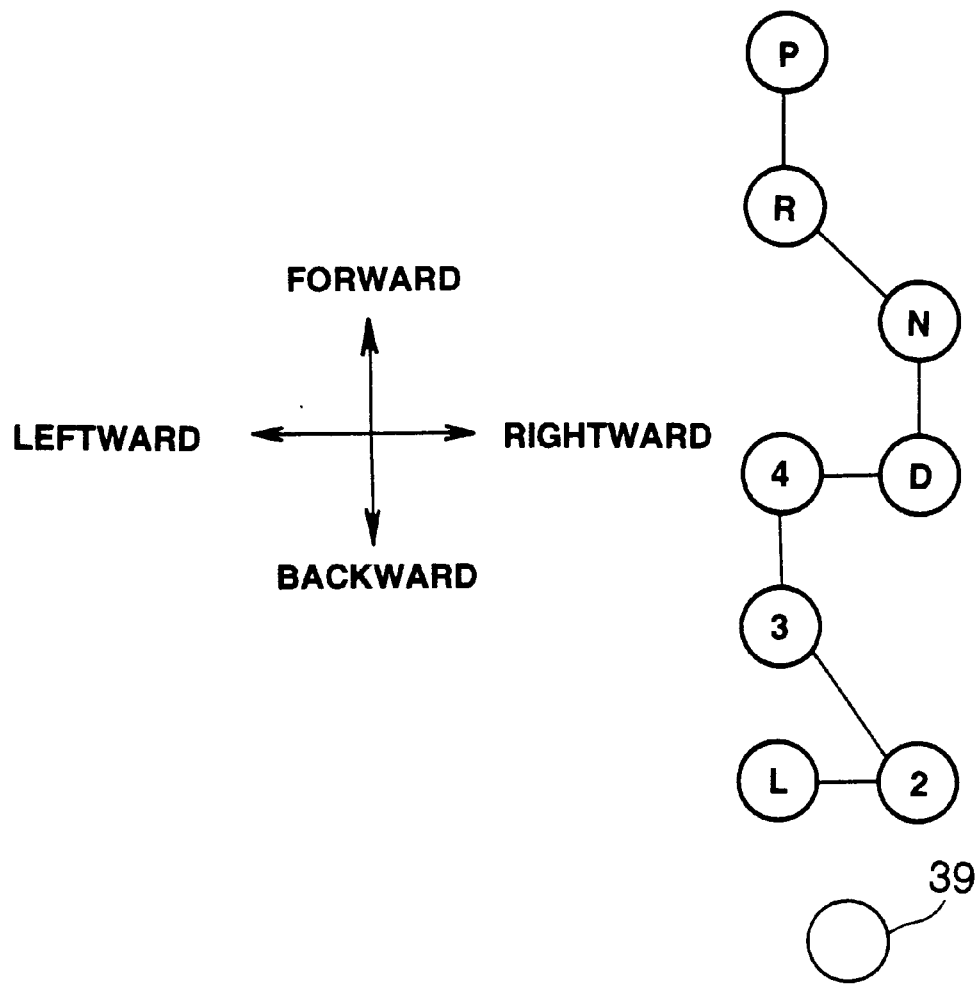
FIG. 14 is a diagram showing configuration of range positions in the shift apparatus.

FIG. 14 shows the operated positions of the shift lever 31. Referring to FIG. 14, the shift lever 31 is supported by a supporting unit (not shown) which is capable of shifting the shift lever 31 to eight positions combining six positions in the longitudinal direction of the vehicle and two positions in the lateral direction of the vehicle. Letter P represents a parking range position, letter R represents a reverse range position, letter N represents a neutral range position, letter D represents a drive range position, numeral "4" represents a "4" range position for setting gear stages to the fourth speed, numeral "3" represents a "3" range position for setting gear stages to the third speed, numeral "2" represents a "2" range position to the second speed and letter L represents a low range position for inhibiting up-shift higher than the first speed. Note that the sports-mode switch 39 is disposed between the "2" range position and the low range position at a position more rearwards of the vehicle.

As shown in FIG. 13, the above-mentioned automatic transmission 3 is arranged to perform the clutch-to-clutch shift between the second speed and the third speed so that both of the engaged states of the third brake $B_3$ and the second brake $B_2$ are switched. This shift must be controlled in such a manner that the frictional engagement units concerning the shift are brought to an underlap state or an overlap state in accordance with the power on/off state or the shift up/down state. Specifically, the hydraulic pressure for the second brake $B_2$ must be controlled in accordance with the applied torque and the hydraulic pressure for the third brake $B_3$ must be controlled in accordance with the progress of the shift. Accordingly, the hydraulic-pressure control circuit 38 includes a circuit shown in FIG. 15 in order to smoothly and quickly perform the shift. The structure of the circuit will be briefly described.

Figure 15:
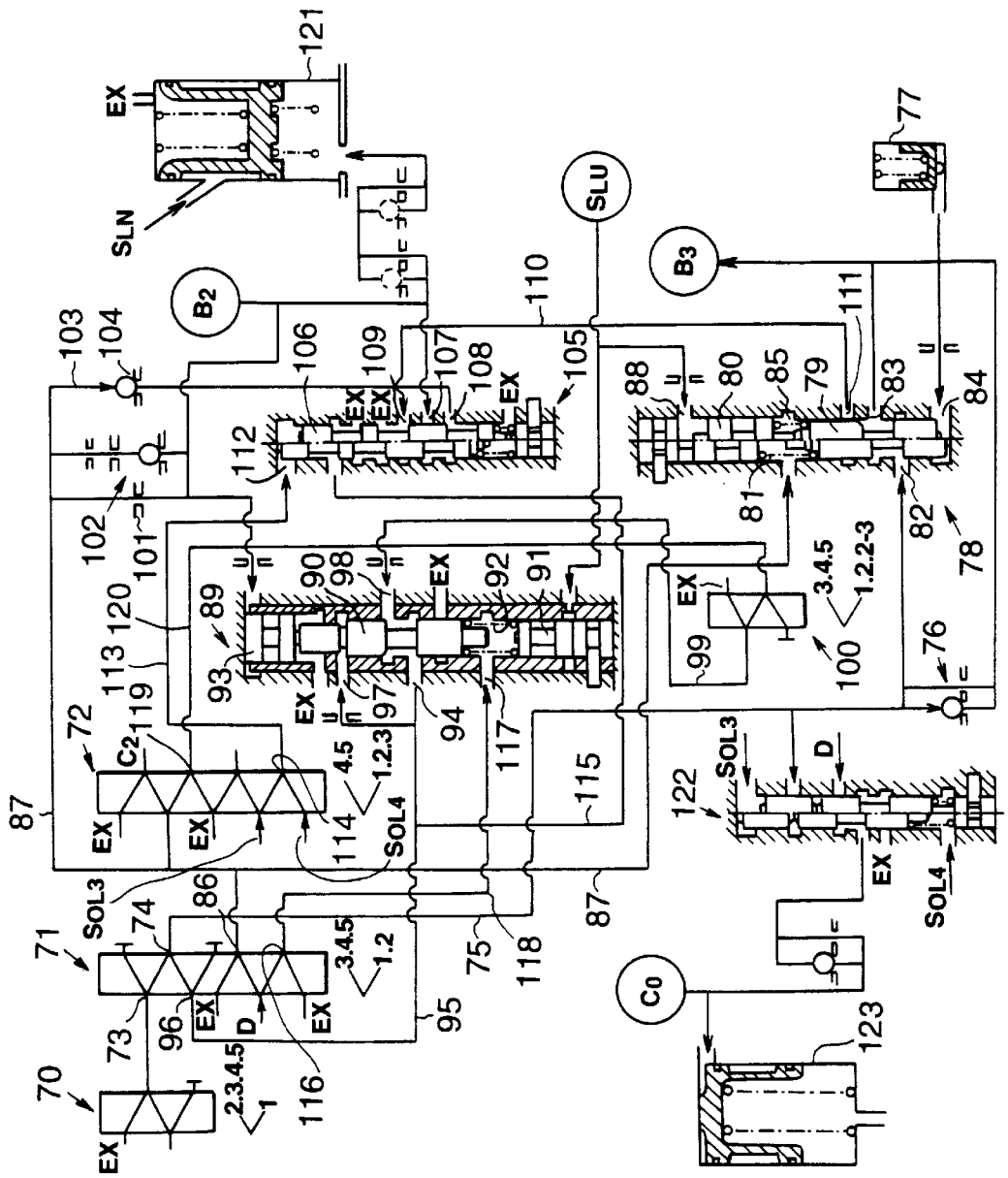
FIG. 15 is a diagram showing a portion of a hydraulic circuit for controlling the engaging pressure employed when shift between the second speed and the third speed is performed.

Referring to FIG. 15, reference numeral 70 represents a 1–2 shift valve, reference numeral 71 represents a 2–3 shift valve and reference numeral 72 represents a 3–4 shift valve. The states of communications of ports in each shift valves 70, 71 and 72 are as indicated below the shift valves 70, 71 and 72. Note that the accompanying numerals represent the gear stages. Among the ports of the 2–3 shift valve 71, the third brake $B_3$ is, through an oil passage 75, connected to a brake port 74 which is communicated with an input port 73 at the first speed and the second speed. An orifice 76 is interposed in the oil passage. A damper valve 77 is connected between the orifice 76 and the third brake $B_3$. The damper valve 77 serves as a buffer by sucking a small quantity of oil pressure in case that a line pressure has been rapidly applied to the third brake $B_3$.

Reference numeral 78 represents a B-3 control valve. The B-3 control valve 78 directly controls the engaging pressure for the third brake $B_3$. The above-mentioned hydraulic pressure control is called as a direct pressure control. That is, the B-3 control valve 78 has a spool 79, a plunger 80 and a spring 81 disposed between the spool 79 and the plunger 80. The oil passage 75 is connected to an input port 82 which is opened/closed by the spool 79. An output port 83 selectively communicated with the input port 82 is connected to the third brake $B_3$. The output port 83 is connected to a feed-back port 84 formed at the leading end of the spool 79. On the other hand, a port 86 among the ports of the 2–3 shift valve 71 which outputs a D-range pressure when the gear stage is not lower than the third speed is communicated through an oil passage 87 with a port 85 opened at a position at which the spring 81 is disposed. A linear solenoid valve $S_{LU}$ for the lock-up clutch is connected to a control port 88 formed in an end portion of the plunger 80.

Therefore, the pressure level which is controlled by the B-3 control valve 78 is set in accordance with the elastic force of the spring 81 and the hydraulic pressure applied to the port 85. The elastic force by the spring 81 is enlarged in proportion to the level of the signal pressure which is supplied to the control port 88.

Referring to FIG. 15, reference numeral 89 represents a 2–3 timing valve. The 2–3 timing valve 89 has a spool 90 having a small land and two lands each having a large diameter, a first plunger 91, a spring 92 disposed between the spool 90 and the first plunger 91, and a second plunger 93 disposed opposite to the first plunger 91 in such a manner that the spool 90 is interposed. An oil passage 95 is connected to a port 94 formed in the intermediate portion of the 2–3 timing valve 89. The oil passage 95 is connected to a port 96 among the ports of the 2–3 shift valve 71 which is communicated with the brake port 74 when the gear stage is not lower than the third speed.

The oil passage 95 is branched at an intermediate position so as to be, and connected through an orifice to the port 97 opened between the small-diameter land and the large-diameter land. A port 98 selectively communicated with the port 94 formed at the intermediate position is connected to a solenoid relay valve 100 through an oil passage 99. The linear solenoid valve $S_{LU}$ for the lock-up clutch is connected to a port opened at an end of the first plunger 91. The second brake $B_2$ is connected through an orifice to a port opened at an end of the second plunger 93.

The oil passage 87 supplies/discharges hydraulic pressure to and from the second brake $B_2$. A small-diameter orifice 101 and an orifice 102 having check ball are interposed at an intermediate position of the oil passage 87. A large-diameter orifice 104 having a check ball which is opened when pressure is discharged from the second brake $B_2$ is interposed in an oil passage 103 branched from the oil passage 87. The oil passage 103 is connected to an orifice control valve 105 to be described below.

The orifice control valve 105 is a valve for controlling pressure discharge rate from the second brake $B_2$. The second brake $B_2$ is connected to a port 107 arranged to be opened/closed by a spool 106 of the orifice control valve 105. The oil passage 103 is connected to a port 108 formed below the port 107 when viewed in FIG. 15. A port 109 formed above the port 107 to which the second brake B2 is connected when viewed in FIG. 15 is a port selectively communicated with a drain port. A port 111 of the B-3 control valve 78 is connected through an oil passage 110 to the port 109. Note that the port 111 is a port which is selectively communicated with the output port 83 to which the third brake $B_3$ is connected.

A control port 112 among the ports of the orifice control valve 105 which is formed at an end opposite to the spring for pressing the spool 106 is connected through an oil passage 113 to a port 114 of the 3–4 shift valve 72. The port 114 is a port which outputs the signal pressure of the third solenoid valve $S_{OL3}$ when the gear stage is not higher than the third speed and which outputs the signal pressure of the fourth solenoid valve $S_{OL4}$. An oil passage 115 branched from the oil passage 95 is connected to the orifice control valve 105 so that the oil passage 115 is selectively communicated with the drain port.

A port 116 of ports of the 2–3 shift valve 71 which output the D-range pressure when the gear stage is not higher than the second speed is connected through an oil passage 118 to a port 117 of the 2–3 timing valve 89 formed at a position at which the spring 92 is disposed. A port 119 of ports of the 3–4 shift valve 72 which is communicated to the oil passage 87 when the gear stage is not higher than the third speed is connected through an oil passage 120 to the solenoid relay valve 100.

Referring to FIG. 15, reference numeral 121 represents an accumulator for the second brake $B_2$. A back pressure chamber of the accumulator 121 is supplied with an accumulator control pressure regulated in accordance with the hydraulic pressure output from the linear solenoid valve $S_{LN}$. Note that the accumulator control pressure is controlled in accordance with the applied torque to be raised in inverse proportion to the output pressure from the linear solenoid valve $S_{LN}$. Therefore, the transitional hydraulic pressure for engaging/releasing the second brake $B_2$ is shifted at higher levels in inverse proportion to the signal pressures of the linear solenoid valve $S_{LN}$. By temporarily lowering the signal pressure of the linear solenoid valve $S_{LN}$, the engaging pressure for the second brake $B_2$ can temporarily be raised.

Reference numeral 122 represents a C-0 exhaust valve 122, and reference numeral 123 represents an accumulator for clutch $C_0$. The C-0 exhaust valve 122 acts to engage the clutch $C_0$ to effect the engine braking at only the second speed in the second speed range.

Therefore, in the above-mentioned hydraulic-pressure circuit, when the port 111 of the B-3 control valve 78 is communicated with the drain, the engaging pressure for the third brake $B_3$ can directly be regulated by the B-3 control valve 78. Moreover, the regulation level can be changed by the linear solenoid valve $S_{LU}$. If the spool 106 of the orifice control valve 105 is positioned in the left-hand half portion of the drawing, the second brake $B_2$ is communicated with the oil passage 103 through the orifice control valve 105. Therefore, the pressure can be discharged through the large-diameter orifice 104. Thus, the draining rate from the second brake $B_2$ can be controlled.

The shift between the second speed and the third speed of the automatic transmission 3 is performed by the clutch-to-clutch shift such that both of the engaging/releasing states of the second brake $B_2$ and the third brake $B_3$ are simultaneously changed. When the third speed is shifted down to the second speed, the second brake $B_2$ engaged at the third speed is gradually released in accordance with the input revolving speed so that the rotation is changed. When the input revolving speed is changed to the synchronized revolving speed of the second speed, the engaging pressure for the third brake $B_3$ is rapidly raised at the moment at which the revolving speed reaches a predetermined revolving speed so that the second speed is realized.

As described above, the third brake $B_3$ must be immediately engaged in response to the change in the rotation occurring attributable to the progress of the shift. On the other hand, each of general frictional engagement units including the third brake $B_3$ has slight clearance between the friction plates and between the friction plate and the piston of a hydraulic servo mechanism. Therefore, any torque capacity is not provided so far as the clearance exists. Accordingly, hydraulic pressure is rapidly supplied to the engaging side frictional engagement units simultaneously or immediately after the shifted output of the clutch-to-clutch to realize a state immediately before the engagement in which the torque capacity is substantially zero. That is, initial hydraulic pressure control is performed. Since the state in which the engagement is immediately established attributable to the further rise in the hydraulic pressure is different depending upon the output from the engine or the revolving speed applied to the automatic transmission, the above-mentioned control unit must perform the following control.

The engaging pressure for each frictional engagement unit of the automatic transmission 3 is judged by the line pressure which is controlled in accordance with the throttle opening θ of the engine 1. For example, engaging pressure $P_{B3}$ for the third brake $B_3$ when the clutch-to-clutch is performed between the second speed and the third speed is controlled in accordance with the progress of the shift. For example, the third speed by engaging the third brake $B_3$. The engaging pressure $P_{B3}$ for the third brake $B_3$ is quickly raised in order to raise the engine revolving speed toward the synchronized revolving speed for the second speed in a power-off state in which the electronic throttle valve 23 is closed when the shift is judged. In a power-on state in which the electronic throttle valve 23 is opened, the engaging pressure is maintained at a low pressure, and then above-mentioned control, rapid change in the engine revolving speed is prevented at a moment before and after the revolving speed reaches the synchronized revolving speed for the second speed. Thus, shift shock is prevented.

However, when the gear stage is shifted down by manually operating the sports-mode switch 39 or the synchronizing shift switch 40, the gear stage is shifted down in a state where the engine revolving speed of the engine 1 to which the automatic transmission 3 is connected has been raised to about the synchronized revolving speed for the gear stage after the shift down if the power-off state has been realized in which the electronic throttle valve 23 is closed when the shift is judged. Since the above-mentioned state in the operation is different from either the power-on state or the power-off state when the gear stage is shifted down from the third speed to the second speed, the following control is performed.

Figure 1:
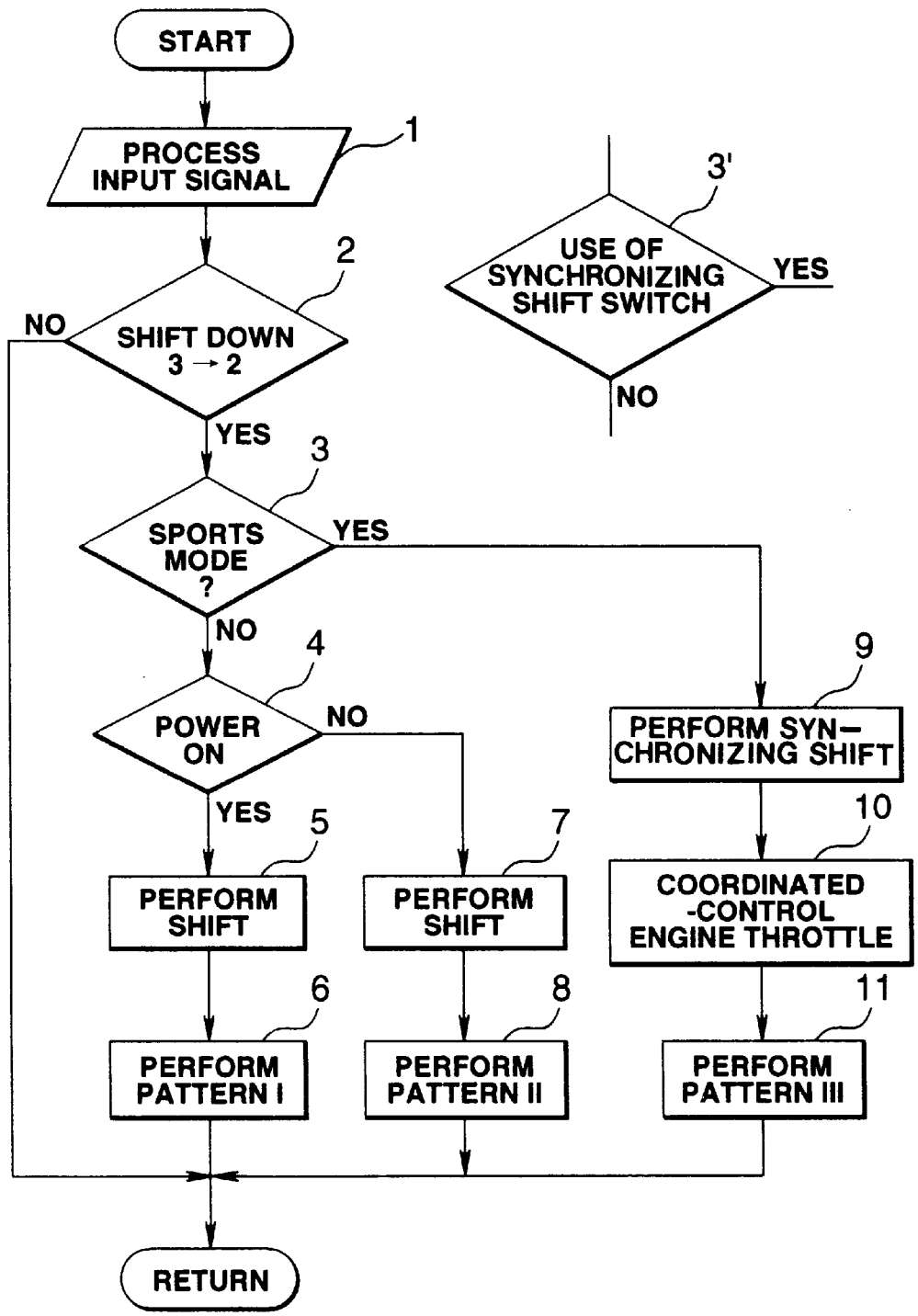
FIG. 1 is a flow chart for explaining the contents of a control which is performed by a control unit according to the present invention.

FIG. 1 is a flow chart showing shift down from the third speed to the second speed in three cases. An input signal is processed (step 1), and then the so-called clutch-to-clutch shift is performed such that the third speed is shifted down to the second speed (step 2). Therefore, step 2 corresponds to the shift determining means according to the present invention. If a negative determination is performed in step 2, any control is not performed. The operation is returned. If an affirmative determination is performed, whether or not the present mode is the sports mode is judged (step 3). Steps 2 and 3 correspond to the shift detecting means.

As described above, the sports mode is a shift mode in which the shift is performed in accordance with the operation of the switch. The switch is structured in such a manner that each gear stage position is provided for a shifting apparatus and a switch, which is switched on by a shift level, is provided for each gear stage position. Another structure is formed such that a sports mode state is set and, in this state, an up-shift switch or a down-shift switch is switched on by a shift lever. Another structure is formed such that an up/down switch is provided for a steering wheel or an instrument panel. Therefore, the judgment in step 3 may be performed by judging whether or not an output has been made from the foregoing switch.

When a negative judgment is performed in step 3 because the shift down has taken place due to change in the running condition, whether or not the state is the power-on state is judged (step 4). That is, whether or not the electronic throttle valve 23 has been opened and the vehicle is being operated by the output from the engine 1 is judged. This judgment can be performed in accordance with the opening θ of the throttle.

When an affirmative judgment is performed in step 4 because of the power-on state, shift is performed by controlling release of the second brake $B_2$ and by controlling the engagement of the third brake $B_3$ (step 5). The foregoing shift is performed because the 2–3 shift valve 71 shown in FIG. 15 is switched, the linear solenoid valve $S_{LU}$ regulates the engaging pressure for the third brake $B_3$ and thus the pressure is discharged from the second brake $B_2$ in a state where the accumulator 121. Since the engine 1 is in an operation state in this case, the engine revolving speed, that is, input revolving speed $N_{CO}$ is raised because the engaging pressure for the second brake $B_2$ state to the third speed is lowered. Therefore, the engaging pressure $B_{P3}$ for the third brake $B_3$ for realizing the third speed is controlled in accordance with pattern I shown in FIG. 2 (step 6).

The control pattern I will be briefly described. The duty ratio of the linear solenoid valve $S_{LU}$ for determining the regulation level for the third brake pressure $P_{B3}$ is raised at time $t_2$ elapsed, by predetermined time $T_1$, from time $t_1$, at which the determination of the shift from the third speed to the second speed has been established so that the initial hydraulic pressure control is performed to reduce the pack clearance. That is, the duty ratio is set to be $D_1$ and this value is maintained for $T_2$ seconds. Then, the duty ratio is maintained at small value $D_2$ to time $t_4$ at which the input revolving speed $N_{CO}$ is raised to the revolving speed which is lower than the synchronized revolving speed for the second speed by predetermined revolving speed $\Delta\alpha$. Thus, the third brake pressure $P_{B3}$ is maintained at a low pressure. Then, the duty ratio of the linear solenoid valve $S_{LU}$ is gradually raised so that the third brake pressure $P_{B3}$ is gradually raised (swept up). At time $t_5$ at which the input revolving speed $N_{CO}$ has reached the synchronized revolving speed, the third brake $B_3$ is completely engaged.

As a result of the above-mentioned control, the third brake $B_3$ substantially starts engaging when the engine revolving speed Ne has been raised to the predetermined revolving speed. Thus, rapid change in the engine revolving speed Ne before and after the moment at which it reaches the synchronized revolving speed for the second speed after the shift down can be prevented. Thus, the shift shock can satisfactorily be prevented.

When the gear stage is shifted down in the power-on state, a control is performed such that the engine torque is reduced by delaying the ignition timing or by temporarily raising the releasing pressure for the second brake $B_2$ on the releasing side.

If a negative judgment is performed in step 4 because of the power-off state, the gear stage is shifted down by releasing the second brake $B_2$ and by engaging the third brake $B_3$ in the power-off state (step 7). Moreover, the engaging pressure for the third brake $B_3$ is controlled in accordance with pattern II shown in FIG. 3 (step 8).

That is, the initial hydraulic pressure control is performed such that a state in which the duty ratio of the linear solenoid valve $S_{LU}$ is set to $D_1$ is maintained for $T_2$ seconds. After the end time $t_3$, the duty ratio of the linear solenoid valve $S_{LU}$ is gradually raised at time $t_6$ at which the input revolving speed $N_{CO}$ is considerably lower than the synchronized revolving speed for the second speed so that the engaging pressure $P_{B3}$ for the third brake $B_3$ is gradually raised. After time $t_7$ at which the third brake pressure $P_{B3}$ has been sufficiently raised, the input revolving speed $N_{CO}$ reaches the synchronized revolving speed for the second speed. Therefore, when the gear stage is shifted down from the third speed to the second speed in the power-off state, the engaging pressure $P_{B3}$ for the third brake $B_3$ is early raised so that the revolving speed of the engine 1 is raised by the torque applied from the output shaft to quickly perform the shift. Moreover, the input revolving speed $N_{CO}$ is smoothly changed to the synchronized revolving speed so that the shift shock is satisfactorily prevented. Since the third brake $B_3$ is, in this case, maintained in the state in which it can immediately be accordance with the input revolving speed, undesirable shift shock does not take place. Since the state is the power-off state in this case, the delay control of the ignition timing and the control for temporarily raising the releasing pressure for the second brake $B_2$ on the releasing side to reduce the output torque are not performed.

If an affirmative judgment is performed in step 3 because of the shift down in the sports mode, synchronizing shift is performed (step 9). Therefore, step 3 corresponds to the synchronizing shift determining means according to the present invention. The synchronizing shift is shift control in which the engine revolving speed Ne is raised to the synchronized revolving speed in the realized gear stage after the shift down and the shift down is performed in this state. Therefore, the electronic throttle valve 23 is temporarily opened by the engine electronic control unit 21 to correspond to the release of the second brake $B_2$ and the engagement of the third brake $B_3$.

Figure 4:
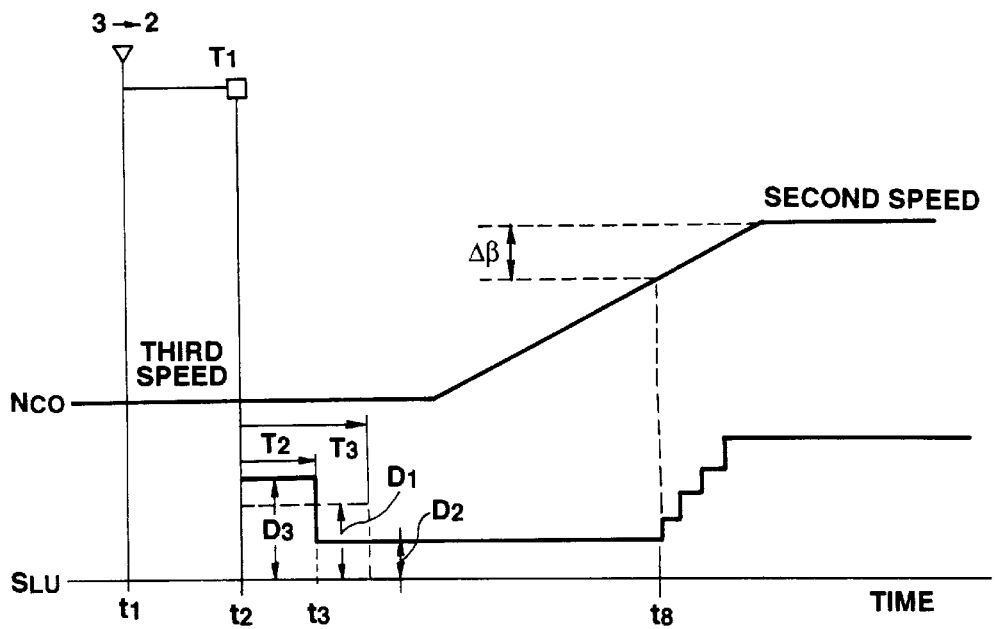
FIG. 4 is a time chart showing control pattern III for the third brake pressure when the gear stage is shifted down from the third speed to the second speed in an synchronizing shift.

Moreover, coordinated control of the opening θ of the throttle and the third brake pressure $P_{B3}$ is performed (step 10). Then, the third brake pressure $P_{B3}$ is controlled in accordance with pattern III shown in FIG. 4 (step 11). Note that steps 6, 8 and 11 correspond to the engagement control changing means according to the present invention.

The coordinated control in step 10 is control in which the throttle opening θ and the third brake pressure $P_{B3}$ are relatively changed in order to cause the engine revolving speed Ne to be changed smoothly with respect to the synchronized revolving speed for the second speed when the gear stage is shifted down to the second speed in a state where the opening θ of the throttle is enlarged. The control is performed in such a manner that either or both of the throttle opening θ and the third brake pressure $P_{B3}$ are arbitrarily changed. Therefore, step 10 corresponds to the coordinated control means according to the present invention.

Figure 5:
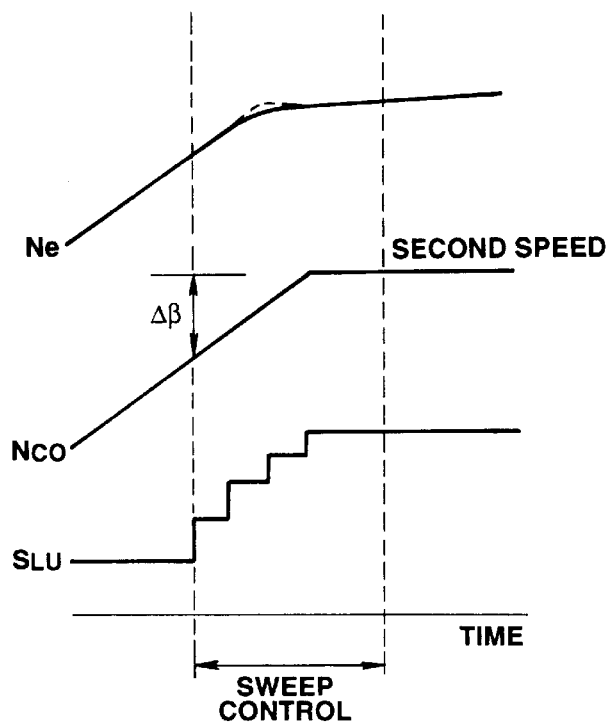
FIG. 5 is a graph showing an example of coordinated control of the throttle opening and the third brake pressure when the synchronizing shift is performed.

The specific example of the coordinated control will be now described. FIG. 5 shows an example in which the throttle opening is changed in such a manner that the duty ratio of the linear solenoid valve $S_{LU}$ is raised in a stepped manner so that the engaging pressure $P_{B3}$ is swept up. Simultaneously, the throttle opening θ is reduced so that the rate of the enlargement of the engine revolving speed Ne is gradually lowered as indicated by a continues line shown in FIG. 5 so as to be smoothly changed to the synchronized revolving speed for the second speed. As a result, torsion in the power transmission system and shock attributable to the torsion can be prevented. Note that change in the throttle opening θ is not required to be always performed simultaneously with sweeping up to the third brake pressure $P_{B3}$. The change may be performed at arbitrary time before and after sweeping up. As described above, the change rate of the third brake pressure $P_{B3}$ may be changed (lowered) by changing the step width of the duty ratio in addition to the change in the throttle opening θ.

The pattern III will be briefly described. The duty ratio of the linear solenoid valve $S_{LU}$ in the initial hydraulic pressure control is set to be value $D_3$ judged on the basis of value $D_1$ in substantially an ordinary state and larger than the value $D_1$ so that the hydraulic pressure which is supplied to the third brake $B_3$ is raised. When the duty ratio $D_1$ has been changed because of learning, also the duty ratio $D_3$ may synchronously be changed at the same rate. Therefore, even if the input revolving speed is raised, the third brake $B_3$ can quickly be set to a state immediately before the satisfactory engagement corresponding to the input revolving speed so as to be brought to a standby state in a low pressure state. Then, the duty ratio is lowered to predetermined value $D_2$ so that the third brake pressure $P_{B3}$ is brought to the standby state at a low pressure. Since the throttle opening has been enlarged, the duty ratio is raised in a stepped manner at time $t_8$ at which the engine revolving speed Ne (the input revolving speed $N_{CO}$) has reached revolving speed which is lower than the synchronized revolving speed for the second speed by predetermined revolving speed $\Delta\beta$ ($>\Delta\alpha$) so that the third brake pressure $P_{B3}$ is raised. The duty ratio is raised stepwise, the width of each of which is made to be larger than that in the power-on state. Therefore, the ratio of rise in the third brake pressure $P_{B3}$ is raised as compared with that in the shift down in the power-on state. That is, step 10 corresponds to the initial hydraulic pressure control means according to the present invention.

Therefore, even if the synchronizing shift is performed in which the engine revolving speed is raised during shift, the initial hydraulic pressure control is completed more quickly as compared with the ordinary state. Therefore, sweeping up of the third brake pressure $P_{B3}$ is not delayed. As a result, even if sweeping up is early performed or even if a period in which standby at low pressure is not substantially performed, the shift control can satisfactorily be performed.

The control which is performed in accordance with the pattern III is arranged in such a manner that the engaging pressure $P_{B3}$ for the third brake $B_3$ which is the on-coming frictional engagement unit is swept up earlier than the case of the power-on down shift in the case of the synchronizing shift in which the throttle opening is smaller than the power-on state or the sweeping up ratio is raised. Therefore, shift can quickly be performed and the input revolving speed $N_{CO}$ (the engine revolving speed) can smoothly be changed to the synchronized revolving speed for the second speed. As a result, shift shock can satisfactorily be prevented.

Since the initial hydraulic pressure control is control for moving the friction plate of the frictional engagement unit to a state immediately before the engagement, time for which the initial hydraulic pressure is supplied may be elongated to correspond to the state in which the input revolving speed has been raised. An example of this case is indicated by a broken line shown in FIG. 4 in which a predetermined duty ratio $D_1$ is maintained for $T_3$ ($>T_2$) seconds. In this case, $T_3$ is judged on the basis of $T_2$. If $T_2$ is changed due to learning or the like, $T_3$ may be changed at a predetermined ratio corresponding to the change.

Figure 6:
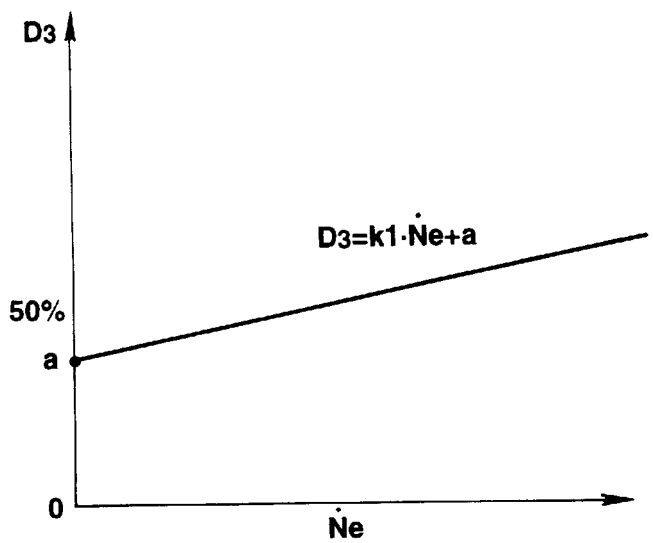
FIG. 6 is a graph showing the relationship between the duty ratio for determining the initial hydraulic pressure control means and the change ratio of the engine revolving speed.
Figure 7:
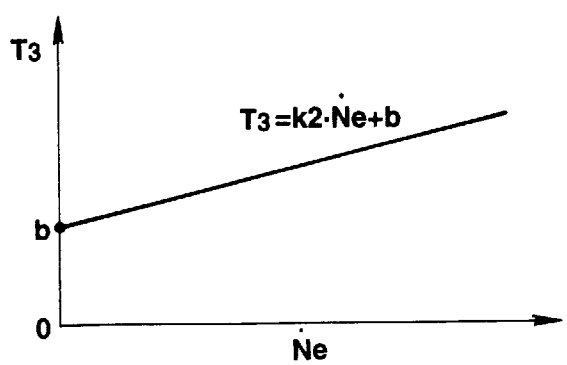
FIG. 7 is a graph showing the relationship between initial hydraulic pressure control time and the change ratio of the engine revolving speed.
Figure 8:
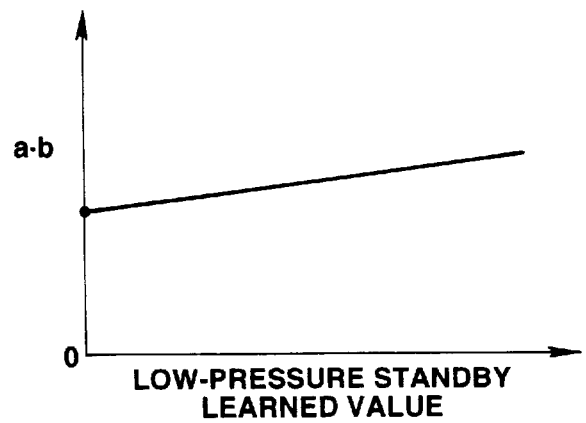
FIG. 8 is a graph showing tendency of change of the duty ratio or constants for use to correct the initial hydraulic pressure control time with respect to low-pressure standby learned value.

When the hydraulic pressure for use in the initial hydraulic pressure control or the time for which the hydraulic pressure is maintained is changed to be adaptable to the synchronizing shift, the duty ratio $D_3$ and time $T_3$ may be judged as shown in FIGS. 6 to 8. That is, the foregoing values are set to be the functions of the change ratio (Ne dots) of the engine revolving speed Ne and their coefficients k1 and k2 and constants a and b are corrected in accordance with the values learned (learning is performed after the shift has been performed) in the state of standby at low pressure.

FIG. 8 shows general tendency of the constants a and b with respect to the learned value of the standby pressure at low pressure. That is, the initial hydraulic pressure control time is elongated or the hydraulic pressure is raised in proportion to the change ratio of the engine revolving speed.

Since the correction of the initial hydraulic pressure control is performed when the synchronizing shift is performed, judgment step (step 3') for judging whether or not the shift is the shift down performed by the synchronizing shift switch may be substituted for step 3' shown in FIG. 1.

When the gear stage is shifted down from the third speed to the second speed, the second brake pressure $P_{B2}$ and third brake pressure $P_{B3}$ are controlled in accordance with the learned values. That is, the third speed is set such that the second brake $B_2$ is engaged. In response to the shift signal, discharge of pressure is started from the second brake $B_2$. The second brake pressure $P_{B2}$ is feedback-controlled in accordance with the engine revolving speed Ne when the back pressure for the accumulator 121 is controlled by the linear solenoid valve $S_{LN}$. The control is continued from time $t_{11}$ at which shifted output is performed to time $t_{12}$ at which the engine revolving speed Ne is raised to the synchronized revolving speed for the second speed. Then learning control is performed in which the controlled value of the back pressure for the accumulator 121 with respect to the input torque at the control is judged in accordance with the variation in the feedback quantity. That is, when the gear stage is next shifted down from the third speed to the second speed with the input torque, the learned controlled value is employed to control the back pressure for the accumulator, that is, the controlled value for the releasing pressure $P_{B2}$ for the second brake $B_2$. Note that control of the foregoing type has been disclosed in, for example, Japanese Patent Laid-Open No. 1-150050 and Japanese Patent Laid-Open No. 63-291738.

On the other hand, initial hydraulic pressure control (quick up) of the third brake $B_3$ is performed at time $t_{11}$ to reduce the pack clearance. Thus, the third brake $B_3$ is maintained at a low pressure (brought to a standby state) from time $t_{13}$ at which the initial hydraulic pressure is ended to time $t_{14}$ at which the engine revolving speed Ne reaches a predetermined revolving speed. Then, the duty ratio of the linear solenoid valve $S_{LU}$ is raised step-wise so that the engaging pressure $P_{B3}$ for the third brake $B_3$ is swept up and first applied to time $t_{12}$ at which the engine revolving speed Ne has reached the synchronized revolving speed. Thus, the engaging pressure is rapidly raised. The low standby pressure during the foregoing control is learning-controlled. Control of the foregoing type has been disclosed in, for example, Japanese Patent Laid-Open No. 6-331016.

The engine revolving speed Ne is, when the gear stage is shifted, changed in accordance with the engine torque and the engaging forces of the brakes $B_2$ and $B_3$. Therefore, the learned value is obtained for each throttle opening . However, if the above-mentioned synchronizing shift is performed, the electronic throttle valve 23 is opened when the shift has been started and thus the output from the engine is enlarged. Therefore, the engine torque is made to be different from that in the case of the shift down in which the control of the synchronizing shift is not performed. Thus, the previous learned value is not suitable. Accordingly, the control unit according to the present invention performs the learning control as follows.

Figure 10:
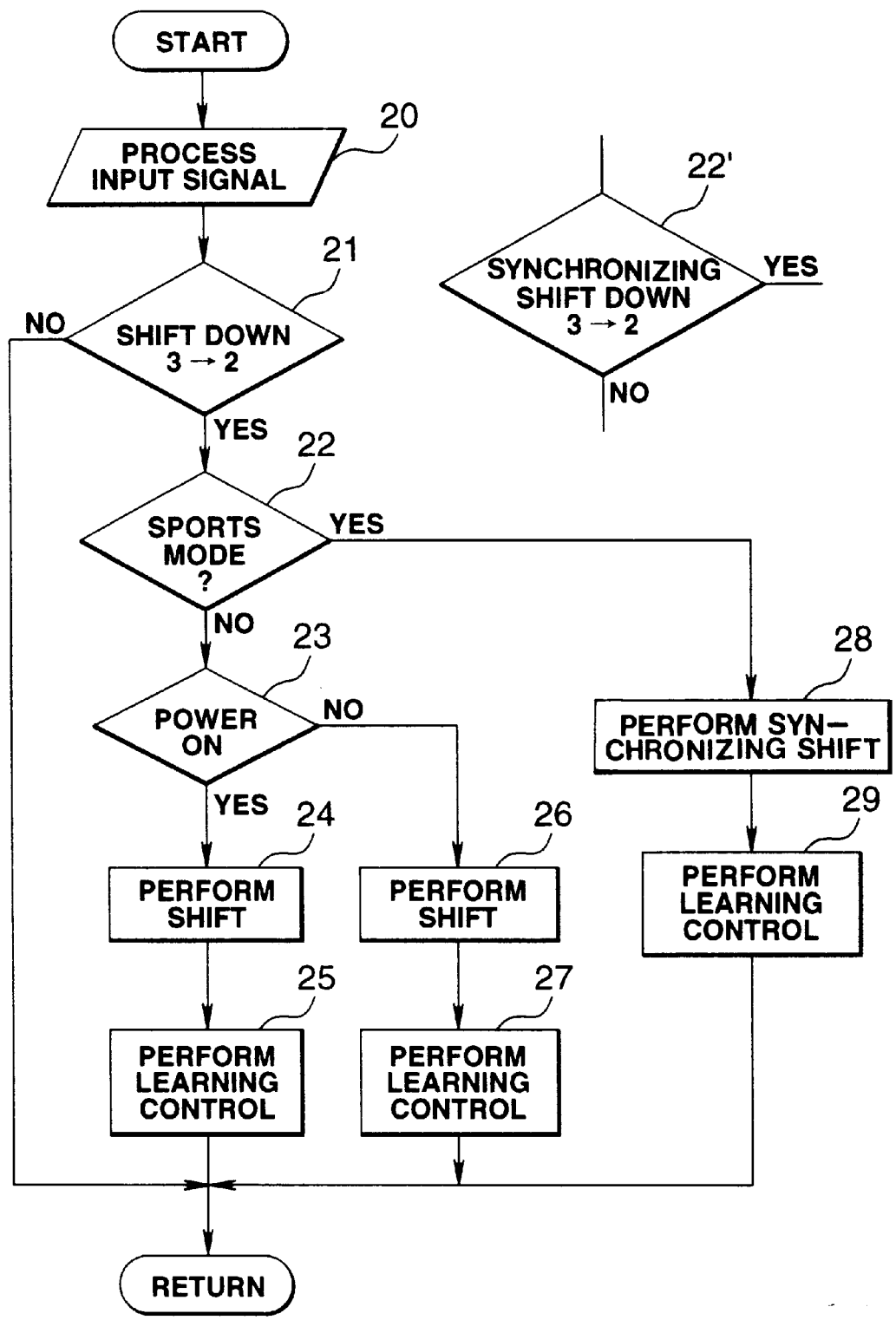
FIG. 10 is a flow chart for explaining the contents of control which is performed by the control unit according to the present invention.

FIG. 10 is a flow chart of the shift down operation from the third speed to the second speed in which the operation is classified into three states. After an input signal is processed (step 20), shift down from the third speed to the second speed, which is a so-called clutch-to-clutch shift, is judged (step 21). If a negative judgment is performed in step 21, any special control is not performed and the operation is returned. If an affirmative judgment is performed, whether or not the mode is the sports mode is judged (step 22).

If a negative judgment is performed in step 22 because of the shift down which is performed because the running condition has been changed, whether or not the state is the power-on state is judged (step 23). If an affirmative judgment is performed because of the power-on state, shift is, as described above, performed by controlling the release of the second brake B2 and by controlling the engagement of the third brake B3 (step 24).

Foregoing steps 20 to 24 are the same as steps 1 to 5 shown in FIG. 1.

If the shift down is performed in the power-on state, control of the linear solenoid valve $S_{LU}$ and control of the back pressure for the accumulator 121 by the linear solenoid valve $S_{LN}$ are performed in accordance with the learned value as described above. During the shift, learning of the hydraulic pressure for each of the brakes $B_2$ and $B_3$ is performed and the learned value is stored (step 25). In this case, the learned values are stored in the form of controlled values or in the form of, for example, a map composed of corrected values of the controlled values. The learned values are stored and used as learned values for the shift down in the power-on state and for the shift mode which is not the synchronizing shift.

Figure 9:
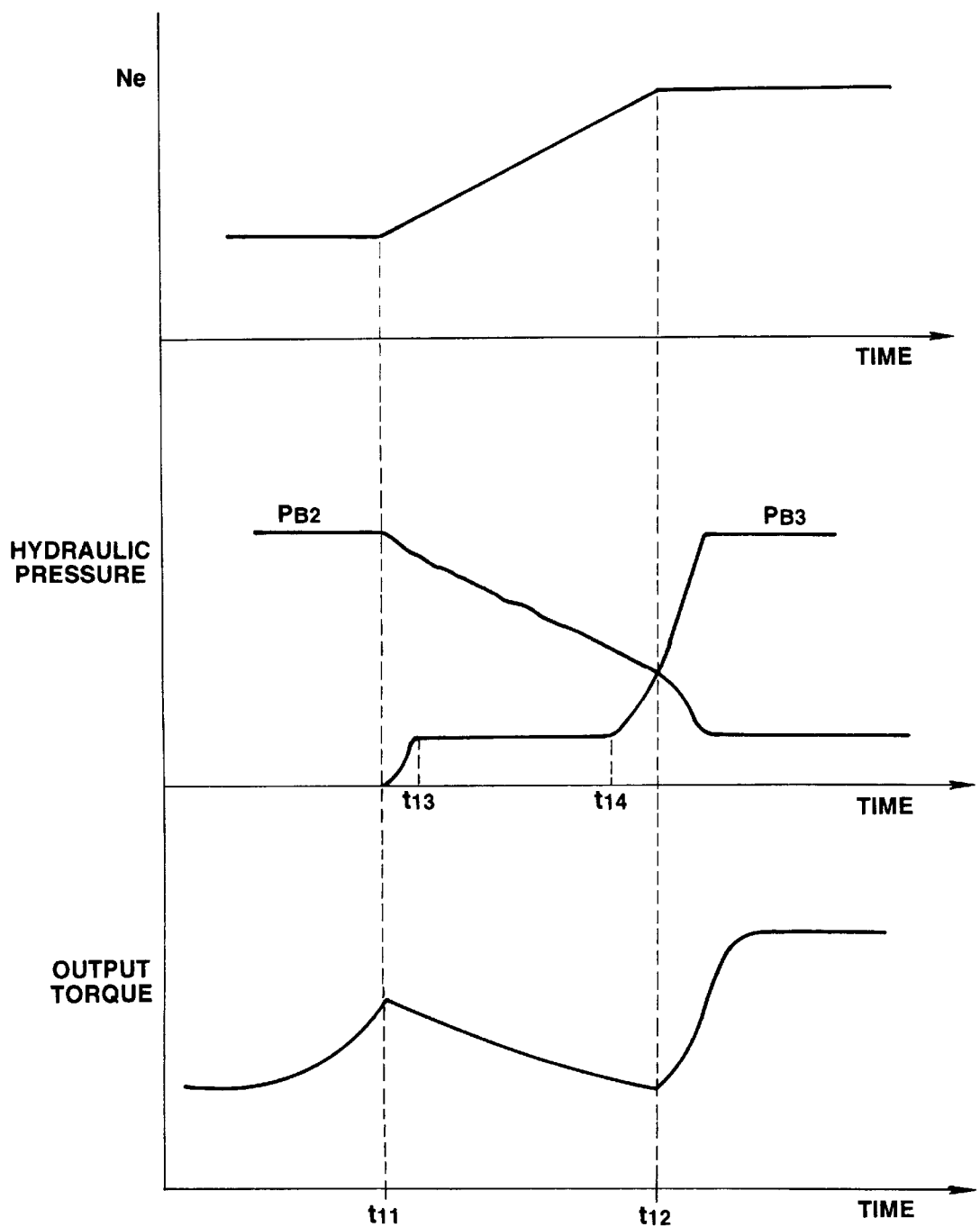
FIG. 9 is a time chart schematically showing changes in the engine revolving speed, the hydraulic pressure and the output torque realized when clutch-to-clutch shift is performed from the third speed to the second speed.

If a negative judgment is performed in step 23 because of the power-off state, shift down in the power-off state is performed (step 26). Also in this case, the second brake pressure $P_{B2}$ is controlled by feedback-controlling the back pressure for the accumulator 121 in accordance with the characteristic of the accumulator 121 so as to be changed as shown in FIG. 9. Step 26 above is the same as step 7 shown in FIG. 1.

As described above, the control of the linear solenoid valve $S_{LU}$ and the control of the back pressure for the accumulator 121 by the linear solenoid valve SLN are performed in accordance with the learned values. During the shift, the hydraulic pressure for each of the brakes $B_2$ and $B_3$ is learned so as to be stored as learned value (step 27). In this case, the learned values are formed in the form of controlled values or in the form of a map composed of corrected values of the controlled values. The learned values are stored and used as learned values for the shift down in the power-off state and for a shift mode which is not the synchronizing shift. That is, the learning control is performed individually from that in the power-on state and the synchronizing shift to be described later.

If an affirmative judgment is performed in step 22 because of the shift down in the sports mode, the synchronizing shift is performed (step 28). Control in step 28 is the same as step 9 shown in FIG. 1.

The hydraulic pressure for each of the brakes $B_2$ ad $B_3$ during the synchronizing shift is learning-controlled (step 29). In this case, the learned values are stored as controlled values or in the form of, for example, a map composed of corrected values of the controlled values. Since the shift is the synchronizing shift in which the engine revolving speed Ne is raised to the synchronized revolving speed, the learned values are stored and used individually from the shift in the power-on state or the power-off state. The learning control is performed individually from that in the power-on state and the power-off state. That is, step 29 corresponds to the learning control changing means according to the present invention.

Since the synchronizing shift is not limited to the shift down in the sports mode and is performed by switching the the synchronizing shift switch on, the judgment step (step 22') for judging whether or not the shift down is the shift down in the synchronizing shift may be substituted for step 22 shown in FIG. 10.

Although the foregoing embodiment is structured such that the learning control of the hydraulic pressure when the synchronizing shift is performed is performed individually from the learning control of the hydraulic pressure in the power-on state or the power-off state, the present invention may be structured such that the learning control of the hydraulic pressure in the synchronizing shift is further changed in accordance with the degree of rise in the revolving speed of the power source, for example, the engine. In this case, a structure may be formed such that the change rate (rise rate) is detected from a detected value of the revolving speed of the power source after the determination of the synchronizing shift has been performed. Then, the learning control of the hydraulic pressure is individually performed for each of results of the detection. Specifically, the structure is formed into a control unit for an automatic transmission characterized in that the learning control of the hydraulic pressure is changed to correspond to the degree of rise in the revolving speed in a case of the shift in which the revolving speed of the power source is temporarily raised. Although the description of the above-mentioned embodiment has been performed about the shift down from the third speed to the second speed, the present invention is not limited to the above-mentioned embodiment. The present invention may be applied to an apparatus for controlling shift down to another gear stage or an apparatus for directly controlling the hydraulic pressure for the frictional engagement unit by a linear solenoid valve or the like. Therefore, the frictional engagement unit, the engaging pressure of which including the initial hydraulic pressure must be controlled, may be a frictional engagement unit except for the second and third brakes. The present invention is characterized by controlled contents peculiar to the synchronizing shift. Therefore, the controlled contents are not limited to the control pattern shown in FIG. 4 and the contents may arbitrarily be changed. The present invention may be embodied in an automatic transmission or its control unit having a gear train and a hydraulic-pressure circuit different from those shown in FIGS. 12 and 15. Note that the power source may be another power output unit, such as an electric motor, which is employed in place of the engine.

The advantages of the present invention will synthetically be described. According to the present invention, when the revolving speed of a power source is temporarily raised even in a case of a shift down in a power-off state, the hydraulic pressure for the frictional engagement unit is controlled in a manner different from that in the case of the ordinary power-off shift down. Therefore, the hydraulic pressure for the frictional engagement unit is made to be adaptable to the input torque. As a result, adverse shift shock and deterioration in the durability of the frictional engagement unit can reliably be prevented.

Since the present invention is structured such that the initial hydraulic pressure is controlled to correspond to temporal rise in the revolving speed of the power source in a case of a so-called clutch-to-clutch down shift, delay of the shift, undesirable shift shock and deterioration in the durability of the frictional engagement unit can be prevented.

Moreover, the present invention, structured such that the hydraulic pressure for the frictional engagement unit at the final stage of the shifting operation is controlled to correspond to the rise in the revolving speed of the power source, is able to prevent shock occurring attributable to torsional vibrations of the power transmission system. In particular, a significant effect can be obtained in a case where the revolving speed of the power source and the hydraulic pressure for the frictional engagement unit are controlled in a coordinated manner.

When the hydraulic pressure for the frictional engagement unit is learning-controlled, the present invention is structured in such a manner that different learning controls are performed between the case where the revolving speed of the power source is temporarily raised and the case where the same is not raised even if the power-down shift is performed. Therefore, the hydraulic pressure for the frictional engagement unit can furthermore appropriately be controlled with respect to the input torque. As a result, shift shock can be prevented and the durability of the frictional engagement unit can be improved.

What is claimed is:

1. A control system for an automatic transmission, which is capable of controlling hydraulic pressures for frictional engagement units when a predetermined shift is performed such that a first frictional engagement unit is engaged and a second frictional engagement unit is released, and the automatic transmission being connected to a power source, a revolving speed of which is temporarily raised when a predetermined shift down is performed, the control system comprising:

shift judging means for judging a shift which is performed by engaging and releasing said first and second frictional engagement units;

synchronizing shift judging means for judging whether the shift judged by said shift judging means will be a shift down in which the revolving speed of said power source will be temporarily raised independent of engine input by a driver as compared to a shift down in which the revolving speed of said power source is not raised;

initial hydraulic-pressure control means for raising engaging pressure for said first frictional engagement unit immediately after the shift has been judged by said shift judging means and for retaining said engaging pressure during the shift down in which the revolving speed of said power source is temporarily raised, to a level higher than the engaging pressure realized when the shift down is not the shift down in which the revolving speed of said power source is temporarily raised; and hydraulic-pressure control changing means for changing the control of the hydraulic pressures for said frictional engagement units, when a shift judged by said shift judging means is performed, between the case where the shift judged by said synchronizing shift judging means is the shift down in which the revolving speed of said power source is temporarily raised and a case where the shift judged by said synchronizing shift judging means is the shift down in which the revolving speed of said power source is not raised and for changing the control of the engaging pressure immediately after the control by said initial hydraulic pressure control means.

2. A control system for an automatic transmission, which is capable of controlling hydraulic pressures for frictional engagement units when a predetermined shift is performed such that a first frictional engagement unit is engaged and a second frictional engagement unit is released, and the automatic transmission being connected to a power source, a revolving speed of which is temporarily raised when a predetermined shift down is performed, the control system comprising:

shift judging means for judging a shift which is performed by engaging and releasing said first and second frictional engagement units;

synchronizing shift judging means for judging whether the shift judged by said shift judging means will be a shift down in which the revolving speed of said power source will be temporarily raised independent of engine input by a driver as compared to a shift down in which the revolving speed of said power source is not raised;

initial hydraulic-pressure control means for raising engaging pressure for said first frictional engagement unit immediately after the shift has been judged by said shift judging means; and hydraulic-pressure control changing means for changing the control of the hydraulic pressures for said frictional engagement units, when a shift judged by said shift judging means is performed, between the case where the shift judged by said synchronizing shift judging means is the shift down in which the revolving speed of said power source is temporarily raised and a case where the shift judged by said synchronizing shift judging means is the shift down in which the revolving speed of said power source is not raised, for changing the control of the engaging pressure immediately after the control by said initial hydraulic pressure control means and for elongating a time during which the engaging pressure is raised.

3. A control system for an automatic transmission, which is capable of controlling hydraulic pressures for frictional engagement units when a predetermined shift is performed such that a first frictional engagement unit is engaged and a second frictional engagement unit is released, and the automatic transmission being connected to a power source, a revolving speed of which is temporarily raised when a predetermined shift down is performed, the control system comprising:

shift judging means for judging a shift which is performed by engaging and releasing said first and second frictional engagement units;

synchronizing shift judging means for judging whether the shift judged by said shift judging means will be a shift down in which the revolving speed of said power source will be temporarily raised independent of engine input by a driver as compared to a shift down in which the revolving speed of said power source is not raised;

sweeping up means for raising an engaging pressure for said first frictional engagement unit at a final stage of the shift; and hydraulic-pressure control changing means for changing the control of the hydraulic pressures for said frictional engagement units, when a shift judged by said shift judging means is performed, between the case where the shift judged by said synchronizing shift judging means is the shift down in which the revolving speed of said power source is temporarily raised and a case where the shift judged by said synchronizing shift judging means is the shift down in which the revolving speed of said power source is not raised, wherein said hydraulic pressure control changing means includes sweeping up changing means for changing the control of the hydraulic pressure for said first frictional engagement unit which is raised by said sweeping up means between the case where the shift judged by said synchronizing shift judging means is the shift down in which the revolving speed of said power source is temporarily raised and the case where the shift judged by said synchronizing shift judging means is the shift down in which the revolving speed of said power source is not raised, wherein said sweeping up changing means includes means for causing a timing at which the engaging pressure is raised by said sweeping up means to be made earlier in the shift down in which the revolving speed of said power source is temporarily raised than a timing in an other shift down.

4. A control system for an automatic transmission, which is capable of controlling hydraulic pressures for frictional engagement units when a predetermined shift is performed such that a first frictional engagement unit is engaged and a second frictional engagement unit is released, and the automatic transmission being connected to a power source, a revolving speed of which is temporarily raised when a predetermined shift down is performed, the control system comprising:

shift judging means for judging a shift which is performed by engaging and releasing said first and second frictional engagement units;

synchronizing shift judging means for judging whether the shift judged by said shift judging means will be a shift down in which the revolving speed of said power source will be temporarily raised independent of engine input by a driver as compared to a shift down in which the revolving speed of said power source is not raised;

sweeping up means for raising an engaging pressure for said first frictional engagement unit at a final stage of the shift; and hydraulic-pressure control changing means for changing the control of the hydraulic pressures for said frictional engagement units, when a shift judged by said shift judging means is performed, between the case where the shift judged by said synchronizing shift judging means is the shift down in which the revolving speed of said power source is temporarily raised and a case where the shift judged by said synchronizing shift judging means is the shift down in which the revolving speed of said power source is not raised, wherein said hydraulic pressure control changing means includes sweeping up changing means for changing the control of the hydraulic pressure for said first frictional engagement unit which is raised by said sweeping up means between the case where the shift judged by said synchronizing shift judging means is the shift down in which the revolving speed of said power source is temporarily raised and the case where the shift judged by said synchronizing shift judging means is the shift down in which the revolving speed of said power source is not raised, wherein said sweeping up changing means includes means for raising a raising ratio of the engaging pressure by said sweeping up means in the shift down in which the revolving speed of said power source is temporarily raised than the raising ratio in an other shift down.

* * * * *